(12) United States Patent
Briggs et al.

(10) Patent No.: US 6,503,221 B1
(45) Date of Patent: *Jan. 7, 2003

(54) TEMPERATURE COMPENSATION SYSTEM FOR REGULATING FLOW THROUGH TUBING IN A PUMP

(75) Inventors: Kenneth D. Briggs, San Jose; Dean C. Pryce, Los Gatos; Russel M. Sampson, Mountain View, all of CA (US)

(73) Assignee: Abbott Laboratories, Abbott Park, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/873,471

(22) Filed: Jun. 12, 1997

(51) Int. Cl.$^7$ ............................................. A61M 31/00

(52) U.S. Cl. ..................... 604/67; 604/151; 73/861.05; 73/861.06; 73/204.23

(58) Field of Search .............................. 604/65–67, 151, 604/131, 156, 32, 34, 30; 128/DIG. 12; 417/19, 20, 32, 18, 14; 73/861.05, 861.06, 204.23, 202.5; 374/132–135, 163, 165, 166

(56) References Cited

U.S. PATENT DOCUMENTS

| | | | |
|---|---|---|---|
| 4,384,578 A | * | 5/1983 | Winkler |
| 4,938,079 A | * | 7/1990 | Goldberg |
| 5,018,945 A | | 5/1991 | D'Silva |
| 5,211,626 A | * | 5/1993 | Frank et al. |
| 5,219,327 A | | 6/1993 | Okada |
| 5,712,795 A | * | 1/1998 | Layman et al. |
| 5,782,805 A | | 7/1998 | Meinzer et al. |

FOREIGN PATENT DOCUMENTS

| | | |
|---|---|---|
| DE | 38 27 444 A1 | 2/1990 |
| EP | 0370162 | 5/1990 |

OTHER PUBLICATIONS

Copy of brochure entitled "imed," published by IMED Corporation, Copyright date 1989.
Photograph labeled "IMED–1".
Copy of brochure entitled "Flo–Gard 6301," published by Baxter Healthcare Corporation, Copyright date 1992.
Photograph labeled "Baxter–1".
Sheet entitled "BREEZE™ 175 Volumetric Pump Graphic 2B: Pumping Chamber" illustrating the tubing–receiving region of a LifeCare® 175 Breeze Volumetric Infusion System sold in the U.S.A. by Abbott Laboratories.
Sheet entitled "ASM. Mechanism LC175 (cc) 840–07007, Rev. T" illustrating the tubing–receiving region of a LifeCare® 175 Breeze Volumetric Infusion System sold in the U.S.A. by Abbott Laboratories.

* cited by examiner

Primary Examiner—Brian L. Casler
Assistant Examiner—Cris Rodrigue
(74) Attorney, Agent, or Firm—Beth A. Vrioni (57) ABSTRACT

A peristaltic pump is provided with a housing, a pump head in the housing, and a receiving path defined along a housing and pump head for receiving tubing. Two spaced-apart temperature sensors are provided. One temperature sensor is located adjacent the tubing in a heat conduction path along which heat flows between the sensor and the tubing. The other sensor is located outside of the heat conduction path for sensing ambient temperature. The pump operating speed is adjusted as a function of the sensed temperatures. This accommodates the temperature-dependent rate of recovery of the tubing from its peristaltically deformed configuration to its original configuration.

5 Claims, 6 Drawing Sheets

TEMPERATURE COMPENSATION SYSTEM FOR REGULATING FLOW THROUGH TUBING IN A PUMP

CROSS REFERENCE TO RELATED APPLICATION(S)

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

This invention relates to a liquid delivery system and is especially suitable for use as part of an infusion pump system designed to deliver parenteral and enteral fluids, as well as whole blood or red blood cell components, using a wide variety of standard intravenous administration sets and fluid containers.

BACKGROUND OF THE INVENTION AND TECHNICAL PROBLEMS POSED BY THE PRIOR ART

One conventional type of infusion pump system employs a peristaltic pump in conjunction with an intravenous administration set. The set consists of flexible thermoplastic tubing through which fluid flows from a suspended container, such as a flexible bag or rigid bottle, to a patient's indwelling vein access device, such as a needle or cannula inserted into the patient. A length of the administration set tubing between the fluid container and the patient is mounted in the peristaltic pump which sequentially squeezes adjacent sections of the tubing so as to pump the fluid via a peristaltic action along the tubing into the patient.

Liquid medical products which are intended to be administered intravenously are typically stored in a central location in a hospital or other medical facility. Some such liquid products are typically stored in a refrigerator or cooler to preserve the product efficacy or to extend shelf life.

When a refrigerated liquid product is removed from storage and administered to a patient, the bulk of the liquid within the dispensing container or package typically remains relatively cold during the administration of the liquid patient. The administration tubing set through which the cold liquid flows also becomes cooler.

Conventional administration set tubing is molded from a polyvinyl chloride polymer, and the resiliency of this material decreases substantially with decreasing temperature. On the other hand, when the polyvinyl chloride polymer tubing is at normal room temperature, the tubing is much more flexible and resilient.

A peristaltic pump control system can be simply designed to provide a selected flow rate when operating at a constant speed with the tubing at a particular temperature (e.g., normal room temperature). When such a pump is operated on tubing at normal room temperature to squeeze and release a section of the tubing, the deformed tubing recovers to its original cross-sectional configuration relatively quickly. Thus, before that same section of tubing is subsequently squeezed again by the peristaltic pump, that section of tubing will be filled with substantially the same volume of liquid as was contained in the tubing during the prior pump stroke. Hence, a constant pump stroke rate relative to the section of tubing results in the pumping of constant flow rate of liquid through that section of tubing if the tubing temperature does not change.

However, if the temperature of the tubing decreases, the tubing becomes stiffer and less resilient. This can change the pumping characteristics. Consider the situation if a refrigerated, cold liquid is pumped through the tubing. When the peristaltic pump acts on a section of the cold tubing to first squeeze or deform the tubing into a closed configuration and then releases the tubing, the cold tubing will not recover to its original cross-sectional configuration as quickly as it would if it was at room temperature. Indeed, the tubing may not recover to its original cross-sectional configuration by the time the peristaltic pump again cycles to squeeze closed that same section of tubing. If the cold tubing has only recovered, say, about 75% of its full open cross-sectional configuration before being squeezed again by the peristaltic pump, then that section of tubing would contain substantially less liquid than if that tubing section had fully recovered to its original cross-sectional configuration prior to being subsequently squeezed by the pump.

Typically, peristaltic pumps are intended to supply a liquid through the administration set tubing at an adjustable, but constant rate. The rate may be adjusted to a selected rate over a range of rates. If a patient is supposed to receive, say, 10 milliliters per hour of liquid, then the peristaltic pump can be set to provide that flow rate based upon a pump operating speed which has been determined by the pump manufacturer for tubing at a constant temperature, typically a normal room temperature. If the temperature of the tubing differs from that used by the pump manufacturer in establishing the pump flow control system relationship between pump operating speed and flow rate, then the control system will not provide the desired flow rate when the tubing is at a higher or lower temperature.

Accordingly, it would be desirable to provide an improved system for regulating the fluid flow through a peristaltic pump. Such an improved system should accommodate variations in temperature, including variations in the temperature of the liquid product being administered to the patient as well as variations in ambient temperature.

Preferably, temperature sensing instrumentation used in such an improved system should also be protected from electrostatic discharge so as to eliminate, or at least minimize, the potential for damage to such sensors.

SUMMARY OF THE INVENTION

The present invention provides an improved system which can accommodate designs that have the above-discussed benefits and features. The system is convenient to use and is cost-effective with respect to its manufacture and operation. The system is especially suitable for use in a peristaltic pump. However, the system is applicable to other types of pumps wherein fluid is pumped through tubing and the fluid temperature cannot be directly sensed.

The system is easily operated and can be used with a wide variety of standard administration sets and fluid containers. The system is designed to meet the growing demand for hospital-wide standardization, as well as alternate-site, in-home healthcare standardization.

The improved system of the present invention accommodates safe delivery of fluids to a patient. The system is convenient to operate and is easy to set up.

One aspect of the present invention relates to an improvement in a peristaltic pump for pumping fluid through tubing. The improvement comprises a temperature sensor adjacent the tubing for sensing the temperature of the tubing. If the tubing is cooled because a refrigerated liquid is being pumped through the tubing, then the resulting decrease in pumping flow rate (owing to a slower recovery of the deformed tubing cross section to its original configuration) can be correlated to an increased pump operating speed necessary to maintain the flow at the desired rate substantially independent of temperature variations.

According to another aspect of the present invention, a process is provided for regulating the fluid flow through flexible tubing in a peristaltic pump where a section or length of the tubing which has been peristaltically deformed recovers to its original cross-sectional configuration at a rate dependent upon the fluid temperature. The process includes the step of sensing the temperature at a location on a heat transfer path which includes a portion of the tubing inside the pump. Preferably, the heat transfer path extends from the tubing to a temperature sensor. In the preferred embodiment, the heat transfer path includes interposed materials, such as an electrostatic discharge protection material and an epoxy material bonding the electrostatic discharge protection material to a temperature sensor.

The process includes the further step of sensing ambient temperature inside the pump at a location spaced from the tubing and thermally insulated from the heat transfer path. The process further includes the step of adjusting the pump operating speed as a function of the two sensed temperatures.

According to yet a further aspect of the invention, the process includes disposing a first temperature sensor in the peristaltic pump against the surface of an interposed thermally conductive structure which is located between, and in contact with, the exterior surface of the tubing and the first temperature sensor. The temperature $T_s$ of the surface of the thermally conductive structure is determined by the first temperature sensor.

A second temperature sensor is disposed in the pump at a location spaced from the tubing and interposed thermally conductive structure. The ambient temperature $T_a$ is determined by the second temperature sensor.

Next, the temperature $T_f$ of the fluid at the interior surface of the tubing is calculated according to the formula $$T_f = \frac{bT_a - T_s}{(b-1)}$$

where b is an empirically determined constant equal to $(T_f-T_s)/(T_f-T_a)$ calculated from a measured value of the temperature $T_s$ when both temperatures $T_f$ and $T_a$ are fixed at selected values.

Subsequently, the process operates the pump at a variable speed as a function of the calculated temperature $T_f$.

According to yet another aspect of the invention, the process includes disposing one side of a thermally conductive electrical insulator against the exterior surface of the tubing in the pump. A first temperature sensor is bonded to the other side of the electrical insulator with an interposed layer of thermally conductive bonding material so as to define a heat transfer path from the tubing to the first temperature sensor. The temperature $T_s$ at the interface between the bonding material and the first temperature sensor is determined by the first temperature sensor.

A second temperature sensor is disposed in the pump at a location thermally isolated from the heat transfer path. The second temperature sensor is bonded to one side of a thermally conductive electrical insulator with an interposed layer of thermally conductive bonding material. The ambient temperature $T_a$ is determined by the second temperature sensor.

The process further involves periodically calculating the temperature $T_f$ of the fluid at the interior surface of the tubing according to the formula $$T_f = \frac{bT_a - T_s}{(b-1)}$$

where b is an empirically predetermined constant equal to $(T_f-T_s)/(T_f-T_a)$ calculated from a measured value of the temperature $T_s$ where both temperature $T_f$ and $T_a$ are fixed at selected values.

Subsequently, the process varies the pump operating speed inversely with, and as a function of, changes in the calculated temperature $T_f$.

According to yet another aspect of the present invention, a system is provided for indirectly sensing the temperature of fluid flowing through flexible tubing in a pump. The system includes a first thermally conductive electrical insulator that has oppositely facing first and second surfaces and that is mounted in the pump with the first surface in contact with the exterior surface of the tubing.

The system includes a first temperature sensor and a first thermally conductive bonding material bonding the first temperature sensor to the second surface of the electrical insulator.

The system includes a first electrically and thermally insulating material extending from the bonding material to encapsulate the first temperature sensor.

The system also includes a second thermally conductive electrical insulator that (1) is spaced from the tubing, (2) has oppositely facing first and second surfaces, and (3) is mounted in the pump with the first surface exposed in the pump to the pump ambient temperature.

A second temperature sensor is included in the system, and a second thermally conductive bonding material bonds the second temperature sensor to the second surface of the second electrical insulator.

The system includes a second electrically and thermally insulating material extending from the second thermally conductive bonding material to encapsulate the second temperature sensor.

Yet a further aspect of the invention includes a temperature sensing system of the type described above together with a special housing for being mounted in the pump. The housing includes (1) a first receiving block that defines a first aperture, and (2) a second receiving block that is spaced from the first receiving block and defines a second aperture.

The first thermally conductive electrical insulator includes a first plate defining oppositely facing first and second surfaces. The first plate is mounted in a first receiving block at the end of the first aperture to occlude the first aperture with the first surface of the first plate facing out of the first aperture and with the oppositely facing second surface of the first plate facing into the first aperture.

The first temperature sensor is disposed in the first aperture. The first thermally conductive bonding material bonds the first temperature sensor to the second surface of the first plate.

The second thermally conductive electrical insulator includes a second plate defining oppositely first and second surfaces. The second plate is mounted in the second receiving block at one end of the second aperture to occlude the second aperture with the first surface of the second plate facing out of the second aperture and with the oppositely facing second surface of the second plate facing into the second aperture.

The second temperature sensor is disposed in the second aperture. The second thermally conductive bonding material bonds the second temperature sensor to the second surface of the second plate.

Numerous other advantages and features of the present invention will become readily apparent from the following detailed description of the invention, from the claims, and from the accompanying drawings.

BRIEF DESCRIPTION OF THE DRAWINGS

In the accompanying drawings that form part of the specification, and in which like numerals are employed to designate like parts throughout the same.

FIG. 3 is an enlarged, fragmentary, perspective view of the front of the infusion pump shown in FIG. 2, and FIG. 3 shows the door in the full open position and the administration set tubing removed from the pump;

DESCRIPTION OF THE PREFERRED EMBODIMENT

While this invention is susceptible of embodiment in many different forms, this specification and the accompanying drawings disclose only one specific form as an example of the invention. The invention is not intended to be limited to the embodiment so described, however. The scope of the invention is pointed out in the appended claims.

For ease of description, a pump incorporating features of this invention is described in one normal (upright) orientation, and terms such as upper, lower, horizontal, etc., are used with reference to this orientation. It will be understood, however, that the pump of this invention may be stored, transported, and sold in an orientation other than the orientation described.

Figures illustrating the pump show some mechanical elements that are known and that will be recognized by one skilled in the art. The detailed descriptions of such elements are not necessary to an understanding of the invention, and accordingly, are herein presented only to the degree necessary to facilitate an understanding of the novel features of the present invention.

The pump incorporating features of this invention is used with certain conventional components the details of which, although not fully illustrated or described, will be apparent to those having skill in the art and an understanding of the necessary functions of such components.

Figures 1, 2:
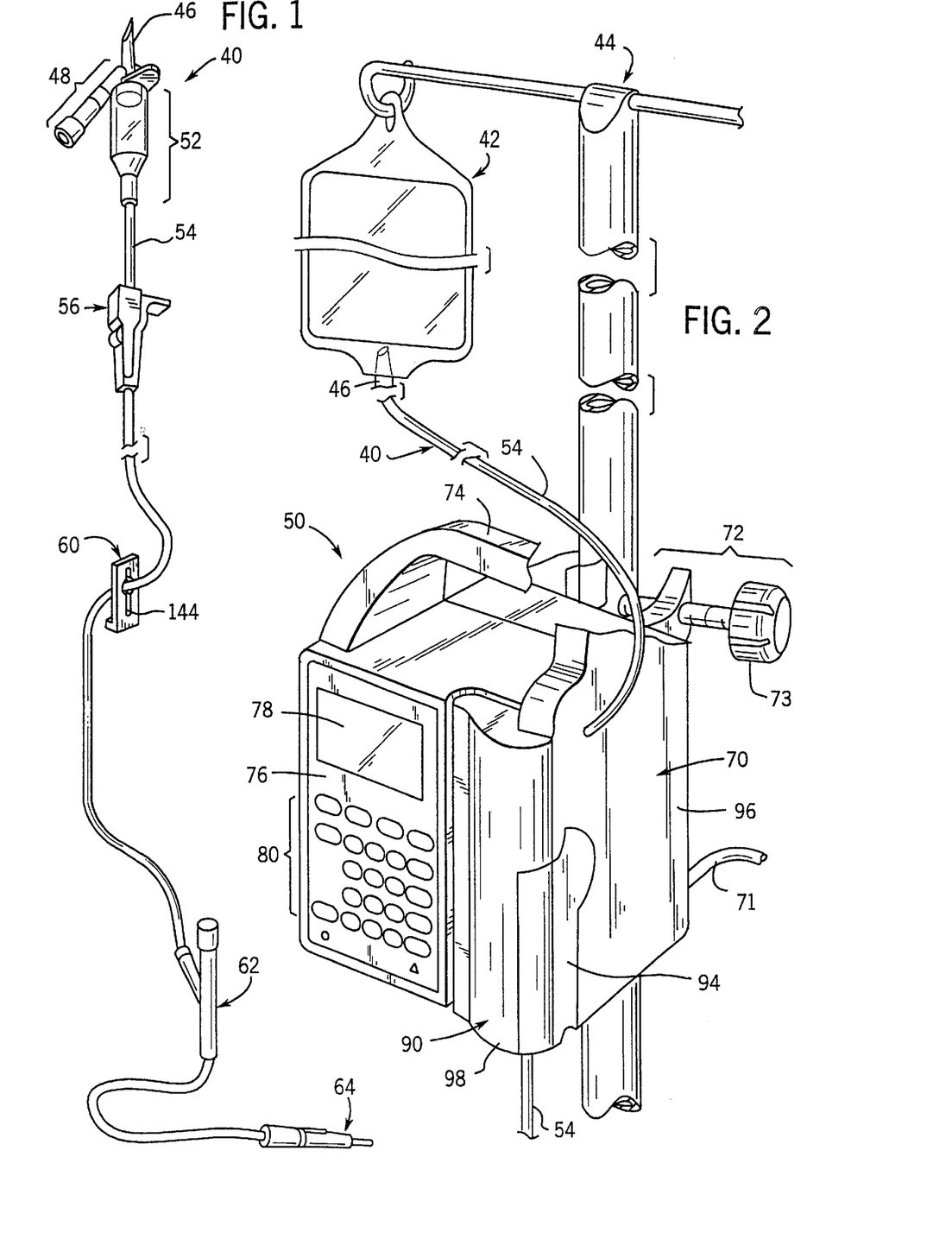
FIG. 1 is a perspective view of a primary, intravenous administration set.
FIG. 2 is a fragmentary, perspective view of an infusion pump that (1) incorporates features of the present invention, and (2) is mounted on an infusion stand supporting a flexible bag container connected to the administration set which is shown in FIG. 1 and which is illustrated in FIG. 2 as loaded in the infusion pump.

The improved system of the present invention accommodates delivery of a fluid to a patient with a variety of standard, intravenous administration sets, one of which is illustrated in FIG. 1 and is designated generally therein by the reference numeral 40. The administration set 4 is typically employed to deliver parenteral fluids, enteral fluids, whole blood, red blood cell components, and the like from a fluid container, such as a bottle or such as a flexible bag 42 which is shown in FIG. 2 supported on an intravenous administration stand 44. A portion of the administration set 4 is engaged by a peristaltic pump 50, and a distal portion of the administration set 40 downstream of the pump 50 can be connected to a patient's indwelling vein access device, such as a needle or cannula (not illustrated) which is inserted into the patient.

The container 42 may be of any suitable conventional or special design. The detailed design and specific structure of the container 42 form no part of the present invention.

The administration set 40 may be of any appropriate conventional or special design. The set 40 illustrated in FIG. 1 is a primary, vented, intravenous set sold in the U.S.A. under the designation No. 1881 by Abbott Laboratories, 100 Abbott Park Road, Abbott Park, Ill. 60064-3500, U.S.A. The administration set 40 has a proximal end defined by a hollow, piercing pin 46 projecting from a conventional bacterial retentive air filter 48 at the upper end of a drip chamber 52. A length of hollow, flexible tubing 54 extends from the bottom of the drip chamber 52 through a roller clamp 56 of the type sold by Abbott Laboratories under the designation CAIR.

Disposed on the tubing 54 downstream of the roller clamp 56 is a slide clamp 60 of the type sold by Abbott Laboratories under the designation DUO SLIDE. The DUO SLIDE clamp 60 is described in more detail hereinafter.

A conventional Y-injection site 62 is provided on the tubing 54 downstream of the slide clamp 60. The distal end of the tubing 54 is provided with a conventional male adaptor 64. The adaptor 64 is designed to be attached to a venipuncture device.

The administration set components may be of any suitable special or conventional design, the details of which form no part of the present invention except that some features of a preferred embodiment of the invention are designed to accommodate, and cooperate with, conventional, flexible tubing 54.

As shown in FIG. 2, the pump So includes a housing 70 and a rearwardly projecting mounting clamp 72 by which the pump 50 can be mounted to the stand 44. The clamp 72 includes a manually operable knob 73. A convenient carrying handle 74 projects upwardly from the top of the housing 70. Electric power is provided through the rear of the pump via a power cord 71.

Figure 3:
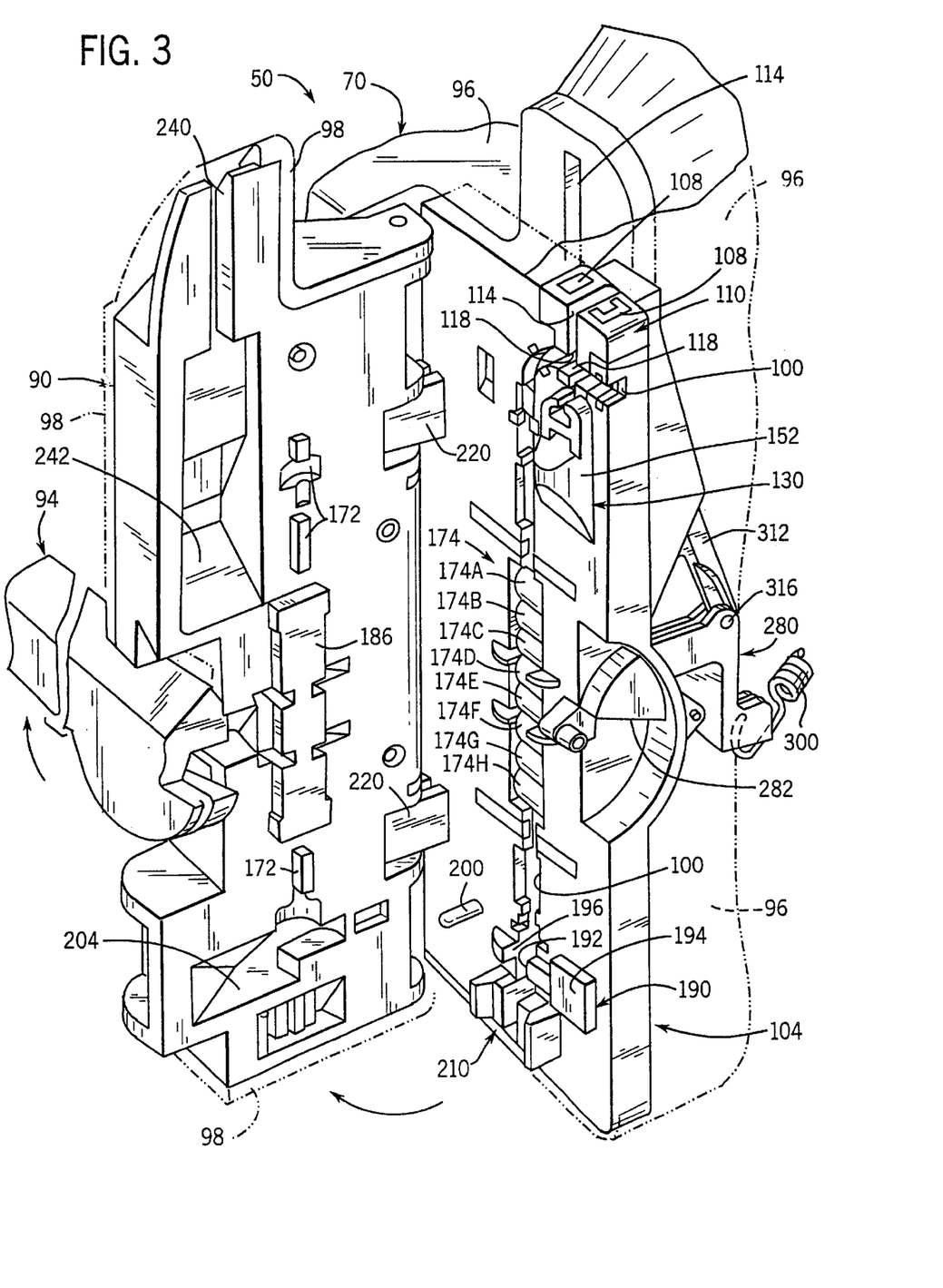

The pump 50 has a front panel 76 containing a liquid crystal display screen device 78 and a key pad 80. Next to the front panel 76 is a front door 90 on which is mounted a door handle 94. As shown in FIG. 3, the door 90 can be opened about 90° by initially pivoting the handle 94 from a substantially vertical orientation (as shown in FIG. 2) to a substantially horizontal orientation (as shown in FIG. 3) to unlatch the door 90 from the housing 70, and then swinging the door 90 outwardly.

In FIG. 3, the open pump 50 is shown with the tubing 54 removed so as to better illustrate the details of the pump structure. Further, as seen in FIG. 3, the housing 70 includes an exterior covering or shell 96 which is partly shown in phantom by dashed lines so as to reveal interior details. Similarly, in FIG. 3, the door 90 has an exterior cover or shell 98 which is shown partly in phantom by dashed lines to better illustrate interior details.

Figure 4:
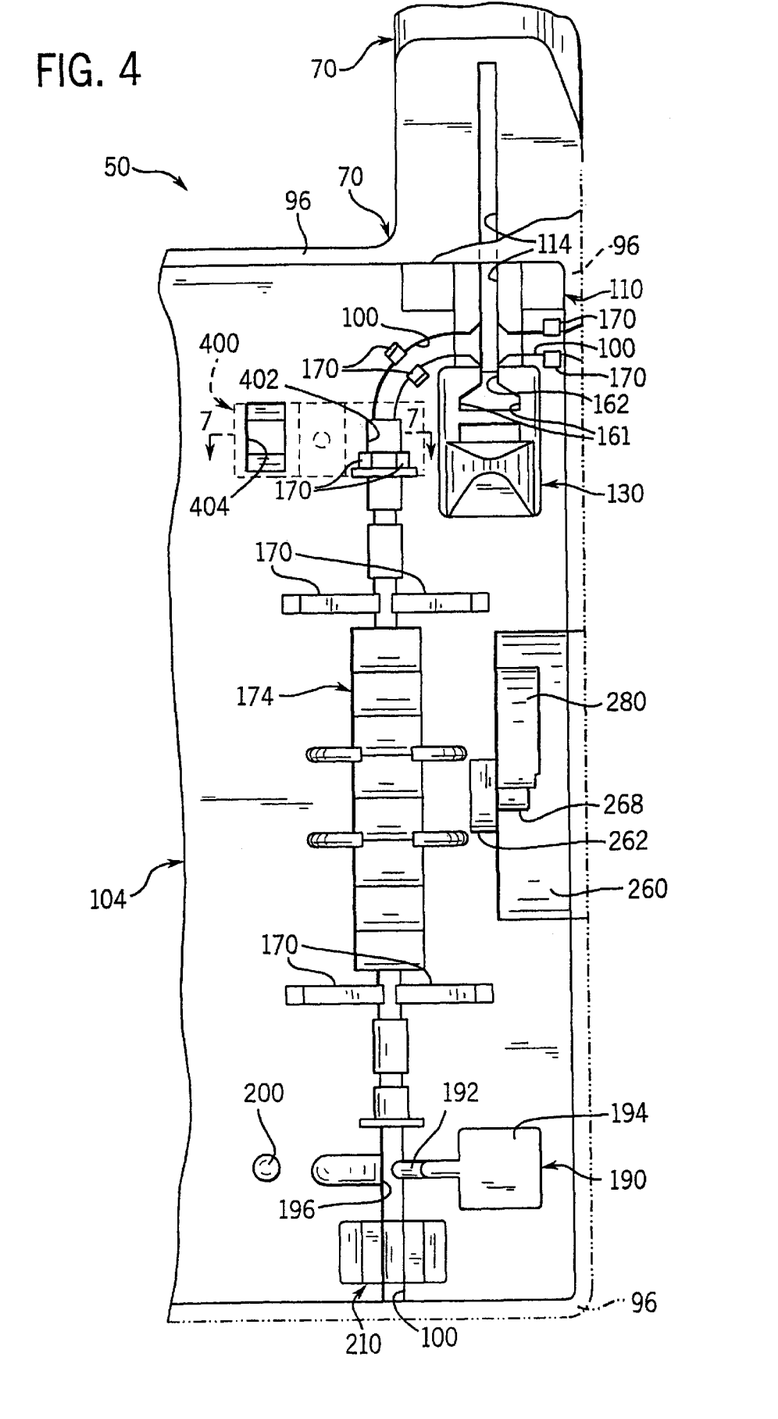
FIG. 4 is a fragmentary, elevational view of the right-hand side of the pump shown in FIG. 3.
Figure 5:
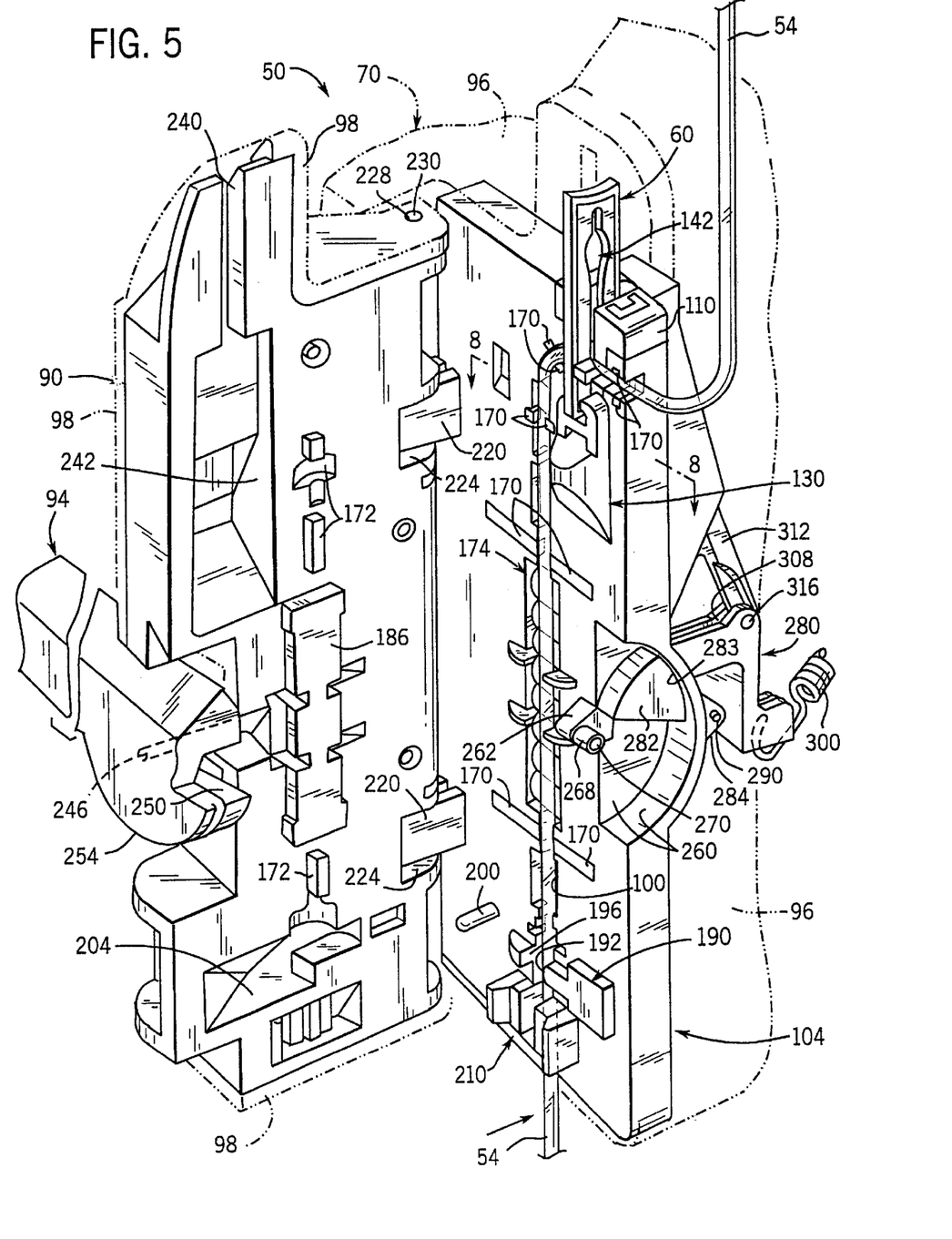
FIG. 5 is a fragmentary, perspective view similar to FIG. 3, but FIG. 5 shows the administration set tubing loaded into the pump.
Figures 6, 7, 8:
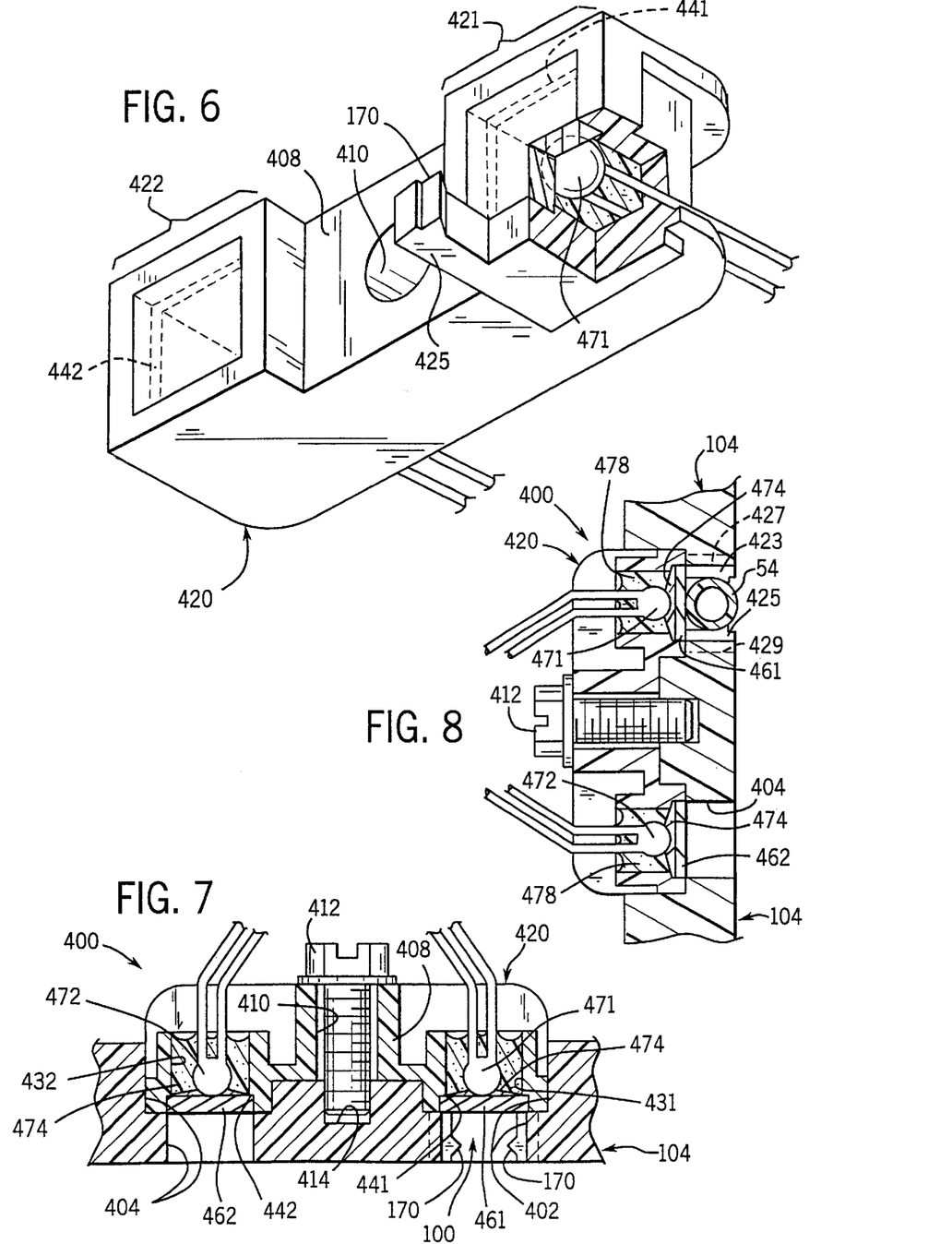
FIG. 6 is a perspective view of the temperature-sensing assembly shown with the surrounding structure omitted.
FIG. 7 is an enlarged, fragmentary, cross-sectional view taken generally along the plane 7—7 in FIG. 4.
FIG. 8 is an enlarged, fragmentary, cross-sectional view taken generally along the plane 8—8 in FIG. 5.

As shown in FIGS. 3, 4, and 5, the open face of the pump housing 70 defines a receiving path 100 for receiving the administration set tubing 54 which is shown loaded in the pump housing 70 in FIG. 6. The receiving path 100 is defined along a generally planar, front, inside face of the open pump housing 70. In particular, the pump 50 includes a block or chassis 104 (FIGS. 3–5) which may be characterized as generally defining a part of the housing 70 to which other pump components are mounted. The chassis 104 includes various cavities and apertures for receiving such other components which are mounted to the chassis or which coact with the chassis 104 as described in detail hereinafter.

As shown in FIGS. 3 and 4, the receiving path 100 in the upper right-hand corner of the chassis 104 is oriented generally horizontally and opens outwardly to the right-hand side of the pump 50 through the exterior shell 96. The exterior shell 96 thus defines an inlet portion of the receiving path 100, and the exterior shell 96 may be characterized as also generally forming part of the pump housing 70.

Although not part of the present invention, a movable slide clamp carrier 130 (FIGS. 3, 4, and 5) is preferably provided at the upper end of the pump for cooperation with the receiving path 100 and with other features at the upper end of the pump. Specifically, the upper right-hand corner of the chassis 104 defines upwardly projecting posts 108 to which are mounted an insert block or skirt 110. The front of the skirt 110 defines a vertical groove 114 which communicates with the horizontal portion of the tubing receiving path 100 as can be seen in FIGS. 3 and 4. The skirt 110 has an inwardly extending notch 118 along the vertical groove 114, and the notch 118 defines a part of the receiving path 100 in the face of the pump.

The bottom of the notch 118 at the front of the skirt 110 form bottom portions of the tubing receiving path 100 on either side of the vertical groove 114. The vertical groove 114 extends upwardly into the housing 70 above the skirt 110 as illustrated in FIGS. 3 and 4.

The chassis 104 is adapted to receive a carrier 130 for holding the tubing slide clamp 60. The carrier 130 has cross slots 161 and 162 (FIG. 4) adapted to receive and hold the slide clamp 60 in a generally vertical orientation as illustrated in FIG. 5. The slide clamp 60 defines an elongate aperture 142 (FIG. 5) having a lower, narrow portion 144 and having an upper, wide portion (FIG. 1).

Prior to insertion of the tubing 54 and slide clamp 60 into the pump 50, the clamp 60 is initially disposed on the tubing 54 in an orientation wherein the tubing 54 is located in the narrow portion 144 of the clamp aperture 142 so as to be squeezed into a closed configuration occluding flow therethrough. The slide clamp 60 is adapted to accommodate subsequent movement downwardly relative to the tubing 54, after the clamp 60 is inserted into the carrier 130.

The slide clamp carrier 130 is adapted to initially receive and hold the clamp 60 at an elevated or raised position as shown in FIGS. 3, 4, and 5 wherein the narrow part 144 of the clamp aperture 142 is around the tubing 54 to squeeze the tubing closed. The carrier 130 is adapted to be subsequently moved to a lowered position (not shown) wherein the wide part of the clamp aperture 142 is around the tubing to permit flow. The mechanisms for effecting movement of the carrier 130 between the upper, elevated position and the lowered position are described hereinafter.

Movement of the carrier 130 downwardly from the elevated position (illustrated in FIG. 5) to the lowered position carries the slide clamp 60 downwardly relative to the tubing 54 which is held in the tubing receiving path on the ledge 120 above the carrier 130 and which becomes positioned in the wide portion of the clamp aperture 142.

When the slide clamp 60 is first fully inserted into the carrier 130, the tubing 54 is received within the channel defining the receiving path 100 on either side of the vertical groove 114. The chassis 104 includes pairs of opposed tabs 170 (FIG. 5) which project slightly into the channel of the receiving path 100 so as to grip the tubing 54 by effecting a small, local deformation of the tubing adjacent the tabs 170. The tabs 170 are preferably separately molded insert pieces which are mounted in appropriate receiving cavities within the chassis 104. A number of such pairs of confronting tabs 170 are provided along the receiving path 100 as shown in FIGS. 3 and 6.

A peristaltic pump head 174 is disposed along the vertical portion of the tubing receiving path 100 as shown in FIGS. 3, 4, and 5. The peristaltic pump head 174 may have any suitable conventional or special configuration. The peristaltic pump head 174 typically comprises a plurality of keys, such as keys 174A–174H, which are sequentially engaged and moved outwardly against the tubing by cam sections on a crank shaft (not visible) which is vertically disposed behind the keys within the pump housing 70. The crank shaft is rotated by a stepping motor (not visible). A platen (FIGS. 3 and 5) 186 is mounted in the door 90 and confronts the tubing 54 adjacent the pump head 174 when the door 90 is closed.

Each pump head key 174A–174H, as it is moved outwardly against the tubing 54, forces the tubing 54 against the platen 186 (FIG. 3) on the closed door 90. The platen 186 is biased toward the pump head 174 by a spring (not visible) acting between the door and the platen 186. As one key 174A–174H is moved outwardly to squeeze the tubing 54 closed against the platen 186, the next, adjacent downstream key is moved outwardly to force the fluid contained within the tube further downstream in the tubing 54 in a peristaltic action. The peristaltic pumping system, including the above-discussed peristaltic pump system elements 174A–174H and platen 186, may be of any suitable conventional or special design. The detailed design and operation of such peristaltic pumping system components, as well as other supporting components, control systems; etc., form no part of the present invention.

The tubing 54 extends below the pump head 174 within the channel defining the tubing receiving path 100. Although not part of the present invention, an anti-flood clamp 190 (FIGS. 3, 4, and 5) is preferably provided below the pump head 174. The tubing 54 extends through the anti-flood clamp 190 near the bottom of the pump.

The anti-flood clamp 190 includes an engaging rib 192 and a laterally extending finger press pad 194 (FIG. 3). Adjacent the engaging rib 192, on one side of the tubing receiving path 100, is an anvil 196 projecting outwardly from the front surface of the chassis 104. The tubing 54 is normally loaded between the anvil 196 and the engaging rib 192 as shown in FIG. 6 when the clamp 190 is open.

A portion of the anti-flood clamp 190 extends behind the chassis 104 and includes a spring-biased, over-center toggle spring latch mechanism (not visible in the figures). Normally, when the pump door 90 is opened, the anti-flood clamp rib 192 is biased to the closed position (not illustrated) and must be first manually opened to permit removal or loading of the tubing 54.

In order to open the clamp 190 at the tubing receiving path 100 between the anvil 196 and the tubing engaging rib 192, the finger press pad 194 is pressed rearwardly toward the chassis 104. When the finger press pad 194 is pushed rearwardly to the point where it is substantially parallel to, and adjacent, the surface of the chassis 104 as shown in FIGS. 3 and 5, the over-center toggle spring latch mechanism behind the chassis 104 holds the anti-flood clamp 190 in the open position—even after the operator's finger is removed from the finger press pad 194. This establishes clearance between the engaging rib 192 and the anvil 196 to accommodate positioning of the tubing 54 between the rib 192 and the anvil 196.

When the anti-flood clamp is in the fully opened position illustrated by solid lines in FIG. 5, a portion of the latch mechanism (not visible behind the chassis 104) is forced forwardly so as to extend a pin 200 from a bore 202 in the face of the chassis 104. When the door 90 is subsequently closed, a portion of the door 90 engages the distal end of the pin 200 and forces it inwardly in the bore 202. Inward movement of the pin 200 (through its attachment to the anti-flood clamp 190 behind the chassis 104) causes the flood clamp 190 to pivot outwardly just beyond the over-center point of the toggle-spring mechanism toward the closed position, but the closed door 90 has a recessed engaging surface 204 which prevents the finger press pad 194 and rib 192 from moving to the fully closed position that would squeeze the tubing closed. This permits fluid flow through the clamp 190 when the door is closed. However, when the door 90 is subsequently opened, the finger pad 194 and rib 192 are free to move completely to the fully closed position under the influence of the toggle-spring mechanism so as to clamp the tubing 54 closed.

The anti-flood clamp 190 described above may be of any suitable special or conventional design. The incorporation of an anti-flood clamp 190, and the detailed design and operation thereof, form no part of the present invention.

In accordance with the present invention, the pump 50 includes an air sensor assembly 210 below the anti-flood clamp 190 as illustrated in FIGS. 3 and 5. The air sensor assembly 210 includes a slot that defines part of the tubing receiving path 100. The air sensor assembly 210 actuates an alarm and/or shuts down the pump 50 if the assembly 210 determines that the liquid in the tubing 54 contains air (e.g., bubbles) in a quantity greater than a predetermined minimum amount. The air sensor assembly 210 may be of any suitable conventional or special design (e.g., incorporating ultrasonic piezoelectric transducers). The detailed design and operation of the air sensor assembly 210 forms no part of the present invention.

The pump 50 may include other sensors, switches, alarms, etc., as may be suitable or desired, but such other elements form no part of the present invention.

As illustrated in FIG. 3, the inside surface of the door 90 may include a plurality of projections 172 which align with the channel defining the tubing receiving path 100 when the door 90 is closed and which function to push the tubing 54 into the channel defining the receiving path 100.

The tubing 54 can be easily loaded into the above-described tubing receiving path 100 in the pump 50. Typically, before the administration set tubing is loaded into the pump 50, the container 42 (FIG. 2) is connected to the tubing 54. Prior to connecting the tubing 54 to the container 42, the roller clamp 56 (FIG. 1) is first closed to occlude flow through the tubing 54. Then the outlet on the container 42 (FIG. 2) is exposed. The administration set piercing pin 46 (FIG. 1) is then inserted into the outlet of the container 42 with a twisting motion. The container 42 is then suspended from the stand 44, and the drip chamber 52 (FIG. 1) is filled to the score mark.

Before the tubing 54 is loaded into the pump 50, the administration set 40 is primed. With the pump 50 located below the container 42, the roller clamp 56 is opened to expel air from the administration set tubing 54 while the slide clamp 60 located. on the tubing is in an open condition so as not to occlude the tubing. The roller clamp 56 is then closed. The male adapter 64 at the distal end of the administration set tubing 54 can then be attached to a venipuncture device. If the venipuncture device is not indwelling, then the device must primed prior to making the venipuncture.

Care should be taken to purge air bubbles from the system. Air is dislodged from the back check valve in the Y-site 62 by inverting and tapping it sharply while fluid is flowing.

Prior to loading the tubing 54 into the pump 50, the operator should verify that the roller clamp 56 is between the container 42 and the slide clamp 60. The operator should also verify that the roller clamp 56 is closed and confirm that there is no flow in the drip chamber 52. Next, the slide clamp 60 is closed by pushing the clamp 60 so that the tubing 54 is squeezed closed in the narrow portion 144 of the clamp aperture.

Then the pump door 90 is opened by lifting the door handle 94. The anti-flood clamp 190, which automatically moves to the closed orientation when the door 90 opens, must be latched open by pushing the finger press pad 194. The clamp 190 will remain open after the operator's finger is removed owing to the action the over-center toggle spring mechanism with the clamp 190 as described above.

The administration set tubing 54 is then positioned along the open face of the pump 50. The slide clamp 60 is aligned with the carrier slots. The slide clamp 60, along with the closed tubing 54 disposed therein, is moved inwardly so as to position the slide clamp 60 within the carrier slots and within the housing vertical groove 114. This results in the portion of the tubing 54 adjacent the slide clamp 60 being received within the channel defined in the tubing receiving path 100 above the carrier 130.

The operator then aligns the remaining portion of the tubing 54 adjacent the remaining portions of the receiving path 100, and the operator loads the tubing 54 within the channel of the receiving path 100 from the top to the bottom of the pump (FIG. 5). Care should be taken so as not to stretch the tubing. The tubing 54 is pressed into the channel defining the receiving path 100 with the pad of a finger tip while avoiding contacting the tubing with sharp objects, such as finger nails.

Figures 9, 10, 11, 12:
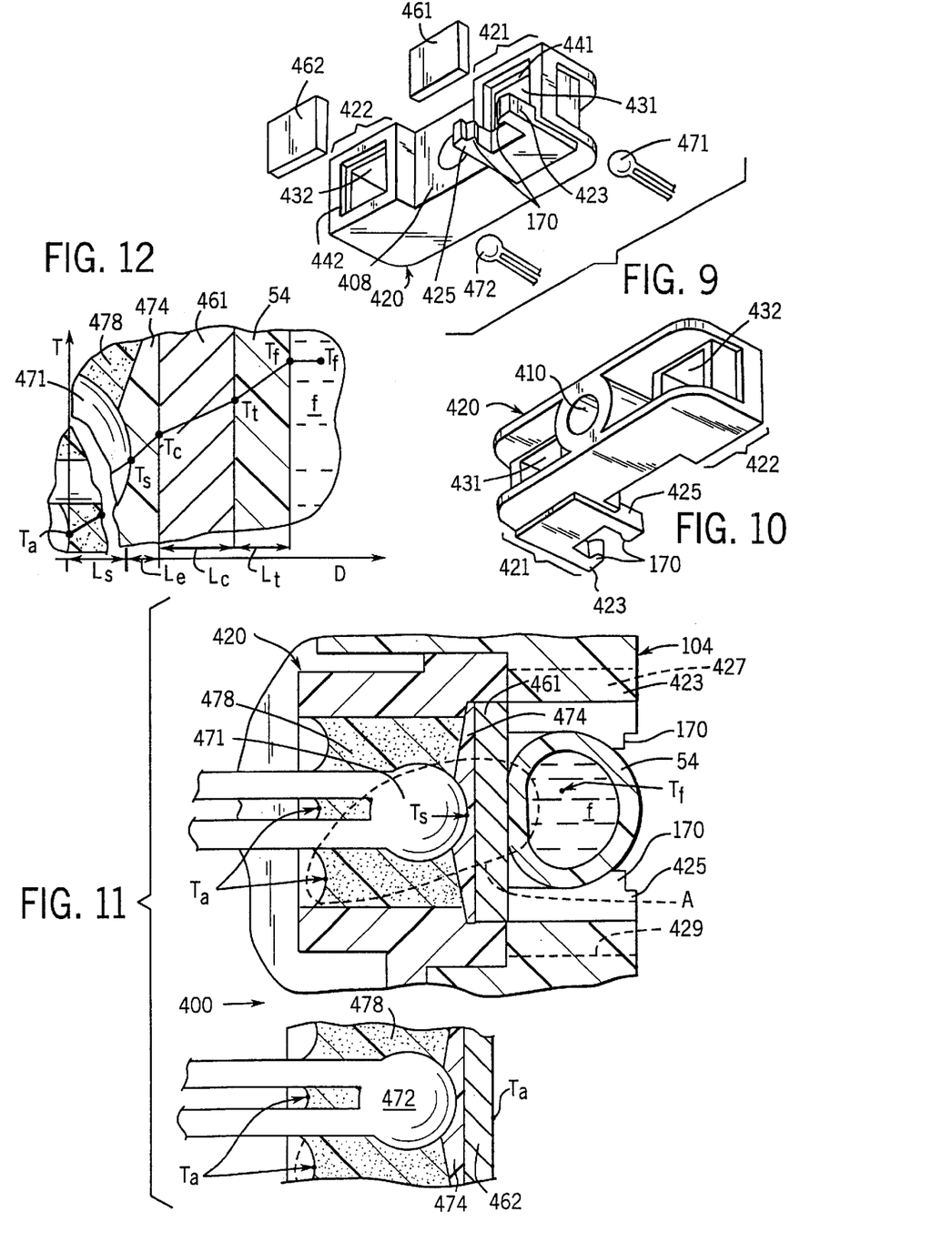
FIG. 9 is an exploded, perspective view of the components comprising the temperature-sensing assembly shown in FIG. 6.
FIG. 10 is a perspective view of the temperature-sensing assembly housing.
FIG. 11 is a greatly enlarged, fragmentary, cross-sectional view similar to FIG. 8.
FIG. 12 is a greatly enlarged, fragmentary, cross-sectional view of the portion of the structure shown within the dashed boundary line A in FIG. 11 and superimposed on a graph of temperature versus distance.

The door 90 is then closed over the loaded tubing 54, and the handle 94 is latched by pushing it downwardly to the fully closed position illustrated in FIGS. 2 and 11. The inside of the door 90 includes an upper groove 240 (FIGS. 3 and 5) and a cavity or recess 242 (FIGS. 3 and 5) for receiving the outwardly projecting portions of the slide clamp 60 and carrier 130, respectively, when the door 90 is closed.

Next, before starting the pump 50, the roller clamp 56 above the pump 50 should be opened, and the lack of flow into the drip chamber 52 should be confirmed.

With reference to FIG. 5 (which shows the administration set tubing 54 loaded in the pump 50), it will be appreciated that in the illustrated preferred form of the pump, the tubing receiving path is defined substantially in a plane along the housing 70 (which housing 70 includes the chassis 104 and the top skirt 110 that define the channel of the tubing receiving path 100). The plane in which the loaded tubing 54 lies is generally vertical when the pump is in the normal operating orientation.

The door 90 is preferably mounted on a generally vertical axis for pivoting between the open and closed positions. In the preferred embodiment illustrated, the pivot axis of the door 90 is parallel to the portion of the tubing receiving path 100 defined along the face of the pump head 174. The door pivot axis is also offset forwardly of the tubing receiving path 100.

In particular, the door pivot axis is defined in the chassis 104, as shown in FIGS. 3 and 5, by a pair of door pin-receiving projections 220. As illustrated in FIG. 5, the door 90 defines two slots 224 for each receiving one of the chassis projections 220. Each of the chassis projections 220 defines a pin-receiving bore aligned with bores in the door 90, such as an upper bore 228 visible in FIG. 5. Pins, such as upper pin 230 (visible in FIG. 5) and a lower pin (not visible), are disposed in the bores of the chassis projections 220 and in the bores in the door 90 for providing a connection accommodating pivoting movement of the door 90.

The door handle 94 pivotally mounted with a pin 246 (FIG. 5) to the door 90 for rotation between the open position (FIG. 5) and the closed position (FIG. 2). The handle 94 includes a latch slot 250 (FIG. 5) and an exterior camming surface 254 (FIG. 5).

As shown in FIG. 5, the housing chassis 104 defines a recessed latch region 260 for receiving the camming surface 254 of the door handle 94. Projecting outwardly from the edge of the chassis 104 adjacent the latch region 260 is a boss 262 (FIG. 5). As shown in FIG. 5, a latch roller 268 is disposed on a pin 270 mounted in the boss 262. When the door 90 is closed, the latch pin 270 and roller 268 are received in the slot 250 of the handle 94. As the handle 94 is rotated about the handle pivot pin 246 (in the counterclockwise direction as viewed in FIG. 5), the handle latch slot 250 slides along the roller 268 until the handle 94 is in the fully closed orientation as shown in FIG. 2. Owing to (1) a curvature of the latch slot 250, and (2) the relative positions of the door handle pivot pin 246 and the latch pin roller 268, the resiliency of the system (especially as may be provided by the spring-biased platen 186 in the door 90) creates an over-center toggle latch action holding the door handle 94 in the fully closed position to maintain the door 90 latched closed.

The carrier 130 (FIG. 5) has previously been described as being movable between an elevated position (FIG. 5) and a lowered position (not shown). The movement of the door handle 94 to the latched closed position (illustrated in FIG. 2) effects movement of the carrier 130 between the elevated and lowered positions by a linkage mechanism which is next described. In particular, the exterior camming surface 254 on the door handle 94 is designed to engage a cam follower element or crank 280 (FIG. 5). The crank 280 defines a cam follower surface 282. As shown in FIG. 5, the portion of the crank 280 defining the cam follower surface 282 extends through a slot 283 in a portion of the chassis 104 which defines the recessed latch region 260. The crank 280 is pivotally mounted to the back of the chassis 104 adjacent the recessed latch region 260. As can be seen in FIG. 5, the chassis 104 has a rearwardly projecting, mounting boss 284, and the boss 284 defines a bore 286 for receiving a pin 290. The crank 280 is pivotally mounted on the pin 290.

As shown in FIG. 5, the crank 280 includes a slot 296 and a bridging rib 298. As shown in FIG. 5, one end of a helical coil tension spring 300 is connected to crank 280, and the other end of the spring 300 is connected to the chassis (at a location not visible in the figures). The spring 300 normally biases the crank 280 in a counterclockwise direction as viewed in FIG. 5 so as to position the crank cam follower surface 282 outwardly in the recessed latch region 260 when the door handle 94 is in the unlatched or open orientation (FIG. 5).

As shown in FIG. 5, the crank 280 defines a slot 308 which is adapted to receive one end of a link or arm 312 which is pivotally connected to the crank 280 by means of a pin 316.

The link or arm 312 extends upwardly, and the upper end of the arm 312 (not visible in FIG. 5) extends up through the rear portion of the skirt 110 and is partially pivotally connected to a rear portion of the carrier 130 projecting rearwardly through a slot in the chassis 104.

It will be appreciated that when the door 90 is open, the spring 300 pulls the crank 280 to pivot the crank 280 counterclockwise as viewed in FIG. 5. This holds the arm 312 and carrier 130 in the elevated position which accommodates insertion or removal of the slide clamp 60. On-the other hand, the door 90 is shut and the door handle 94 is latched closed as explained in detail above, the door handle camming surface 254 engages the cam follower surface 282 of the crank 280 and causes the crank 282 to pivot clockwise. This pulls the carrier 130 (and slide clamp 60 disposed therein) downwardly so as to position the wide part of the clamp aperture 142 around the tubing 54 and permit flow through the tubing. Subsequently, when the door handle 94 is unlatched and lifted upwardly toward the position illustrated in FIG. 5, the spring 300 again causes the crank 280 and arm 312 to return the carrier 130 (and slide clamp 60 carried therein) to the elevated position (FIG. 5).

When the carrier 130 is returned to the elevated position (FIG. 5), the slide clamp 60 can be removed. It will be appreciated that when the carrier 130 is in the elevated position, the slide clamp 60 is oriented on the tubing 54 in the receiving path such that the tubing 54 is squeezed closed in the narrow portion 144 of the clamp aperture 142. Hence, whenever the door 90 is opened to permit removal of the slide clamp 60, the tubing 54 is always squeezed closed by the slide clamp 60. Thus, if medical personnel fail to close the roller clamp 56 (FIG. 1) prior to removing the tubing 54 from the pump, then there will be no danger of fluid free flowing into the patient even if the lower clamp 190 is opened and the tubing 54 is removed from the pump.

If desired, the pump 50 could be alternatively designed so as to eliminate the above-described movable carrier 130 and linkage mechanism for effecting movement thereof. In such an alternate design, the tubing 54 would just be loaded into the receiving path 100 without locating the slide clamp 60 within the pump. The above-discussed carrier 130 and linkage mechanism for moving it in the pump 50 form no part of the present invention.

As discussed above in the section entitled "BACKGROUND OF THE INVENTION AND TECHNICAL PROBLEMS POSED BY THE PRIOR ART" the capability of some types of conventional peristaltic pumps to deliver accurately a selected flow rate depends upon, among other things, the capability of the administration set tubing 54 to recover to its original cross-sectional configuration relatively quickly. When a section of the tubing 54 is squeezed by one of the peristaltic pump head keys 174A–174H, the tubing cross section is temporarily flattened closed. When the peristaltic pump head key pulls away from the deformed tubing 54, the tubing 54 tends to return to its original cross-sectional configuration owing to the inherent resiliency of the material (which is typically a polyvinyl chloride polymer). If the section of tubing quickly recovers substantially to its original cross-sectional configuration, then the tubing will receive substantially the same volume of liquid that it had contained prior to being squeezed by the peristaltic pump head key. Thus, when the peristaltic pump head key subsequently again squeezes that same section of tubing closed, substantially the same volume of liquid will be forced out of that section of the tubing. This will result in a substantially constant liquid flow rate through the tubing as a result of the operation of the pump.

However, if the tubing temperature decreases (as could occur if a refrigerated liquid product was being pumped to the patient), then the tubing will become less flexible and less resilient. The capability of the tubing wall to recover quickly from its deformed, closed configuration back to its full open cross-sectional configuration will be significantly reduced. The rate of recovery will decrease with decreasing temperature. At very low temperatures, the tubing may fail to return to its original cross-sectional configuration even over a long period of time. Because the peristaltic pump head keys are cyclically reciprocating against and away from the tubing, if the tubing does not recover to its original cross-sectional configuration quickly enough, then the pump head keys will be squeezing the tubing before the tubing is able to recover to its original configuration. Thus, each section of tubing will contain a smaller liquid volume compared to the liquid volume that would be contained in the same section of tubing if the tubing was permitted to recover to its original cross-sectional configuration. As a result of the reduced liquid volume within the tubing, the liquid flow rate through the pump will decrease—unless the pump operating speed is increased.

A peristaltic pump could be provided with a simple control system which assumes that the pump is pumping liquid through tubing at normal room temperature. Such a simple control system could be designed so that the medical technician can select a desired flow rate which is established by the control system operating the pump at a predetermined speed that will produce such a selected flow rate at normal room temperature. However, if the temperature of the liquid product being pumped differs from normal room temperature, then such a simple control system (having a predetermined correlation between desired flow rate and pump operating speed at a given temperature) will not accurately control the flow rate.

According to one aspect of the present invention, a system is provided for indirectly sensing the liquid temperature during operation of the pump. Further, the system uses the temperature measurement in adjusting the pump operating speed to provide a more accurate flow control. In the preferred embodiment, the system also takes into account ambient temperature. In addition, the preferred form of the system incorporates electrostatic discharge protection. The system is incorporated in a structure which does not interfere with the operator's loading of the tubing into, or unloading of the tubing from, the pump.

FIG. 4 shows the temperature-sensing system which is designated therein generally by the reference number 400 and which is located in the upper portion of the pump housing 70. Most of the temperature-sensing system 400 is mounted within, and behind, the pump chassis 104 as shown in FIG. 7. To this end, the chassis 104 includes a front aperture 402 and a front aperture 404 which provide access to the temperature-sensing system from the inside front portion of the pump which is closed by the door 90. The aperture 402 includes (1) a front portion defined by the tubing receiving path 100, and (2) a rear, wider portion inwardly of the tubing receiving path 100. The aperture 404 has a similar configuration, but the aperture 404 is spaced laterally from the tubing receiving path 100.

The aperture 402 extends from, and behind, the receiving path 100 so that the aperture 402 is thus adjacent, and in communication with, the tubing 54 when the tubing 54 is loaded in the tubing receiving path 100. On the other hand, the aperture 404 is not directly exposed to the tubing 54. The aperture 404 functions as a "window" for accommodating the flow of ambient thermal energy into (or out of) a portion of the temperature-sensing system 400.

The temperature-sensing system 400 includes a housing 420 (FIGS. 6, 9, and 10). The housing 420 is preferably molded from a thermoplastic material as a unitary structure. However, the housing 420 may be fabricated as a multi-piece structure, if desired.

The housing 420 has a central portion 408 (FIGS. 6 and 7) which defines a central aperture 410 for receiving a screw 412. The distal end of the screw 412 projects from the front of the housing central portion 408 and is threadingly received in a bore 414 defined on the inside of the pump housing chassis 104 (FIG. 7).

The housing 420 includes a first receiving block 421 defining a first aperture 431 (FIGS. 9 and 10). The housing 420 also includes a second receiving block 422 defining a second aperture 432 (FIGS. 9 and 10). The second receiving block 422 is spaced from the first receiving block 421.

The housing 420 includes a unique keying feature to insure that during the manufacturing process, the housing 420 is assembled in the correct orientation in the chassis 104. Specifically, the housing 420, as shown in FIG. 9, includes a pair of outwardly extending, spaced-apart, arms 423 and 425 below the receiving block 421. The arms 423 and 425 extend on either side of the tubing path. A tubing retention tab 170 projects inwardly from each of the arms 423 and 425. Each arm is adapted to be received in a mating recess or region of the chassis 104 as shown in FIG. 8. Specifically, the chassis 104 defines a recessed wall 427 for receiving the arm 423, and the chassis 104 defines a recessed wall 429 for receiving the arm 425.

On the other side of the housing 420, below the second receiving block 422, there are no such arms. The chassis 104 does not have any arm-receiving recesses adjacent the aperture 404 in front of the block 422. Thus, during assembly of the apparatus, if the housing 420 is inadvertently turned upsidedown, it will not fit within the apertures defined within the chassis 104. The housing 420 will only fit in the chassis 104 when it is in the proper orientation (as illustrated in the figures) wherein the arms 423 and 425 are received adjacent the recessed slot walls 427 and 429. This establishes a keyed relationship which prevents the housing 420 from being assembled in an incorrect orientation within the chassis 104.

The first receiving block 421 defines a recessed shoulder 441 around the first aperture 431 (FIGS. 6, 7, and 9). The second receiving block 422 defines a recessed shoulder 442 around the second aperture 432 (FIGS. 6, 7, and 9).

A first plate 461 is mounted in the first receiving block 421 on the shoulder 441 at the front end of the first aperture 431 (FIGS. 7 and 9). A second plate 462 is mounted in the second receiving block 422 on the recessed shoulder 442 at one end of the second aperture 432. Preferably, the plates 461 and 462 are identical.

The first plate 461 has oppositely facing first and second surfaces and is mounted to occlude the first aperture 431 with the first surface of the plate 461 facing out of the first aperture 431 and with the oppositely facing second surface of the plate 461 facing into the first aperture 431.

The second plate 462 also has oppositely facing first and second surfaces. The second plate 462 is mounted within the second receiving block 422 so as to occlude the second aperture 432. The first surface of the second plate 462 faces out of the second aperture 432, and the oppositely facing second surface of the second plate 462 faces into the second aperture 432.

Each plate 461 and 462 has two functions. First, each plate 461 and 462 is an electrical insulator which functions as an electrostatic discharge protection barrier. Second, each plate 461 and 462 is thermally conductive so that it functions to conduct heat into and out of the housing 430. In the presently contemplated preferred embodiment, each plate 461 and 462 is fabricated from alumina (96% $AL_2O_3$) having a dielectric strength of 15 KV min. and a thermal conductivity of 24–27 Watts/meter ° K. @ 20° C. Each plate 461 and 462 has an American National Standard Surface Texture surface finish of 35 micro inch or better (in accordance with the American National Standard ANSI B46.1-1985).

As shown in FIGS. 7 and 9, the first aperture 431 is adapted to receive a first temperature sensor or tubing temperature sensor 471. Similarly, the second aperture 432 is adapted to receive a second temperature sensor or ambient temperature control sensor 472. Each temperature sensor 471 and 472 may be of any suitable conventional or special type. A presently contemplated sensor employs an NTC thermistor chip which is similar to the chip used in the thermistor sold in the U.S.A. under the designations DC95 and EC95 by Thermometrics Company which has an office at 808 U.S. Highway #1, Addison, N.J., 108817-4695, U.S.A. The detailed electronic design of the thermistor chip forms no part of the present invention.

Each temperature sensor 471 and 472 is bonded to the second surface of the plate 461 and 462, respectively, with a first thermally conductive bonding material 474 (FIGS. 7, 8, and 11). In the presently contemplated preferred embodiment, the bonding material 474 is an epoxy encapsulant sold under the designation STYCAST 2850 FT by Emerson & Cuming, Inc., having an office at 77 Dragon Ct., Woburn, Mass. 01888, U.S.A. This material has relatively high thermal conductivity, but has a relatively low thermal expansion. It is relatively effective in high-voltage applications. The bonding material 474 functions to securely hold the temperature sensors 471 and 472 in place and provide good thermal conduction from the ceramic plate (461 or 462) to the temperature sensor (471 or 472).

The system also includes an electrically and thermally insulating material 478 (FIGS. 8 and 11). The electrically and thermally insulating material 478 extends from the first thermally conductive bonding material 474 on the first plate 461 and encapsulates the first temperature sensor 471. Similarly, the electrically and thermally insulating material 478 extends from the second thermally conductive bonding material 474 on the second plate 462 and encapsulates the second temperature sensor 472. In a presently contemplated preferred embodiment, the insulating material 478 is an epoxy adhesive sold under the designation ECCOBOND® 51 by Emerson & Cuming, Inc., which has an office at 77 Dragon Ct., Woburn, Mass. 01888, U.S.A.

The electrically and thermally insulating material 478 has two functions. First, it serves to insulate each temperature sensor with respect to the area around each sensor that is not directly in contact with the thermally conductive bonding material 474 on each ceramic plate (461 or 462). This ensures that each temperature sensor 471 and 472 will only sense heat. conducted into the sensor at the front of the sensor through the thermally conductive bonding material 474. Secondly, the insulating material 478 functions as an electrostatic discharge protection barrier.

In view of the fact that each sensor 471 and 472 is located behind an electrostatic discharge protection barrier plate (461 or 462) and is surrounded by the electrostatic discharge protection barrier insulating material 478, each sensor is well-protected against electrostatic discharge. Electrostatic discharges could occur when the pump operator is loading or unloading the tubing 54 and the operator's hand is close to the front of the pump chassis 104 adjacent the temperature sensors 471 and 472. The plates 461 and 462 and the insulating material 478 will minimize, if not eliminate, deleterious effects of such an electrostatic discharge in the vicinity of the temperature sensors.

The above-described temperature-sensing system 400 functions to provide information to a system for controlling the pump motor operating speed as a function of the temperatures sensed by the system. The system will function effectively without requiring direct sensing of the temperature of the liquid flowing through the tubing 54. It will be appreciated that intravenous fluids are typically sterilely packaged and stored. There is usually no practical way to sense directly the temperature of the liquid product that is being pumped by the pump 50 and administered intravenously to the patient. Indeed, in order to insure the integrity of the liquid product and minimize the possibility of contamination, it is desirable to avoid inserting any sensors or other instrumentalities through the packaging or tubing into contact with the liquid product. Accordingly, during operation of the pump, the temperature-sensing system of the present invention uses temperature data which is accumulated without directly contacting the inside of the tubing 54 or the liquid contained therein.

Initially, the control system for the pump 50 is programmed by the pump manufacture based upon some experimentally determined values as explained in detail hereinafter. With reference to FIG. 11, fluid flowing through the tubing 54 is designated by the reference letter f. Temperature of the fluid f within the tubing 54 at an interior location is designated generally in FIG. 11 by $T_f$. As shown in FIG. 12, the fluid temperature $T_f$ exists at the film interface between the fluid f and the inner surface of the wall of the tubing 54.

The ambient temperature inside the pump (with the door 90 closed) is designated generally in FIG. 11 by $T_a$. The ambient temperature $T_a$ is the temperature of the air in the closed pump (adjacent the exterior surface of the control sensor plate 462 and adjacent the rear surface of the insulating material 478 behind both sensors 471 and 472).

If the fluid temperature $T_f$ is higher than the ambient temperature $T_a$ within the pump, then a temperature-gradient will exist as heat is conducted from the fluid f through, the wall of the tubing 54, through the ceramic plate 461, through the bonding material 474, and through the first temperature sensor 471. The temperature will fall as the heat flows through the structure, and this may be schematically illustrated in FIG. 12 in a graph of temperature as a function of distance from an ambient temperature location behind the first sensor 471. The ambient temperature location behind the first sensor 471 is diagrammatically illustrated at the point $T_a$ in FIGS. 11 and 12. FIG. 12 represents an environment wherein the fluid temperature $T_f$ is greater than the ambient temperature $T_a$.

If the liquid has been refrigerated so that the temperature $T_f$ is less than the surrounding ambient temperature $T_a$ within the pump, then the graph of the temperature gradients in FIG. 12 would slope in the direction from the temperature sensor 471 downwardly with increasing distance from the temperature sensor 471 toward the fluid f. Whether the heat is flowing away from the temperature sensor 471 or into the temperature sensor 471 makes no difference to the analysis herein presented.

As shown in FIG. 12, a temperature gradient exists across the wall of the tubing 54 between the fluid temperature $T_f$ on the inside of the tubing and a lower temperature $T_t$ at the outside of the tubing wall in contact with the ceramic plate 461.

There is also a temperature gradient across the ceramic plate 461 so that the lower temperature at the inner surface of the plate 461 may be designated as $T_c$.

Owing to a temperature gradient across the bonding material 474, a lower temperature $T_s$ may be designated at the interface between the bonding material 474 and the surface of the temperature sensor 471 adjacent the bonding material 474.

A temperature gradient also exists across the temperature sensor 471 to a location of lower ambient temperature $T_a$ adjacent the insulating material 478.

The insulating material 478 also surrounds the ambient control sensor 472. The plate 462 and bonding material 474 in front of the sensor 472 conduct the ambient heat from the inside front face of the pump 50 to the ambient control temperature sensor 472. The ambient temperature $T_a$ is sensed by the sensor 472 through the plate 462 and material 474. The temperature gradient across the plate 462 and material 474 is very small. Thus, the actual temperature sensed by the sensor 472 is sufficiently close to the actual ambient temperature $T_a$ on the exterior of the plate 462 so that the temperature sensor 472 can be regarded as sensing the ambient temperature $T_a$. It has been found that this approximation to the ambient temperature $T_a$ is sufficiently accurate for the ambient temperature normally existing in the pump, and that the measurement of the temperature by the control sensor 472 can be advantageously used in the pump fluid temperature compensation system as described in detail hereinafter.

The heat conduction through the temperature sensing system structure can be modeled with certain approximations. According to Fourier's Law for steady-state heat conduction, the unidimensional rate of heat conduction from a fluid through a multi-layer structure (energy per unit time), q, can be generally calculated as function of the structure cross-sectional area A, the thermal conductivity k of each layer, the conduction path length L through each layer, the fluid flow coefficient h at the interface of the fluid and the adjacent layer, and the temperature difference $\Delta T$ between the fluid and the exterior of the structure. Specifically, $$q = \frac{A(\Delta T)}{\sum_i \frac{L_i}{k_i} + \sum_i \frac{i}{h_i}} \qquad \text{(EQUATION 1)}$$

In applying equation 1 to the structure of the present invention as diagrammatically illustrated in FIG. 12, the following parameters are identified:

$k_t$ and $L_t$ are the thermal conductivity and wall cross section path length, respectively, of the tubing 54.

$k_c$ and $L_c$ are the thermal conductivity and cross-sectional thickness path length, respectively, of each identical, ceramic plate 461 and 462.

$k_e$ and $L_e$ are the thermal conductivity and cross-sectional path length, respectively, of the thermally conductive bonding material 474.

$k_s$ and $L_s$ are the thermal conductivity and sensor path length, respectively, along the path from the sensor 471 to the location of the ambient temperature $T_a$.

$h_f$ is the fluid film coefficient at the inside surface of the tubing 54.

$T_f$ is the temperature of the fluid f within the tubing 54.

$T_s$ is the temperature at the interface between the tubing temperature sensor 471 and the thermally conductive bonding material 474.

$T_a$ is the ambient air temperature within the closed pump. Some other assumptions are made.

Specifically, the ambient air temperature $T_a$ surrounding the insulating material 478 is assumed to be the same for both the tubing temperature sensor 471 and the ambient temperature control sensor 472. The thermal conductivities $k_t$, $k_c$, $k_e$, and $k_s$ and film coefficient $h_f$ are assumed to be constant with respect to temperature over the range of interest. The conduction path lengths $L_t$, $L_c$, $L_e$, and $L_s$ are each assumed to be uniform across the cross-sectional area A of interest, and the cross-sectional area A is assumed to be constant. (The logarithmic mean area for round tubes could be employed if desired.)

The rate of heat conduction from the fluid f through the structure to the location of ambient temperature $T_a$ adjacent the material 478 around the tubing temperature sensor 471 in the illustrated embodiment of the pump 50 is $$q_1 = \frac{A(T_f - T_a)}{\frac{L_t}{k_t} + \frac{L_c}{k_c} + \frac{L_e}{k_e} + \frac{L_s}{k_s} + \frac{1}{h_f}} \qquad \text{(EQUATION 2)}$$

The rate of heat conduction from the fluid f to the location on the tubing temperature sensor 471 where the temperature $T_s$ is measured is $$q_1 = \frac{1}{\frac{L_t}{k_t} + \frac{L_c}{k_c} + \frac{L_e}{k_e} + \frac{1}{h_f}} \qquad \text{(EQUATION 3)}$$

By substitution in equation 2:
$q_1 = U_1 A(T_f - T_a)$ where $$U_1 = \frac{1}{\frac{L_t}{k_t} + \frac{L_c}{k_c} + \frac{L_e}{k_e} + \frac{L_s}{k_s} + \frac{1}{h_f}}$$ (EQUATION 4)

By substitution in equation 3:
$q_2 = U_2 A(T_f - T_s)$, where $$U_2 = \frac{1}{\frac{L_t}{k_t} + \frac{L_c}{k_c} + \frac{L_e}{k_e} + \frac{1}{h_f}}$$ (EQUATION 5)

Because the rate of heat conduction must be equal at steady state along the heat conduction path from the fluid f to the location of the ambient temperature $T_a$ on the tubing temperature sensor 471, $q_1 = q_2$. Thus, $$U_1 A(T_f - T_a) = U_2 A(T_f - T_s)$$ (EQUATION 6)

Solving equation 6 for $T_f$ yields:

$$T_f = \frac{\left(\frac{U_1}{U_2} \cdot T_a\right) - T_s}{\left(\frac{U_1}{U_2} - 1\right)}$$ (EQUATION 7)

Because the film coefficient $h_f$ and the thermal conductivities $k_t$, $K_c$, $k_e$, and $k_f$ can be assumed to be constant, and because the path lengths $L_t$, $L_c$, $L_e$, and $L_a$ are constant, $U_1$ and $U_2$ are therefore constant. Thus, the quotient $U_1/U_2$ is a constant and can be designated as b where $b = U_1/U_2$. Substituting b in equation 7 above yields:

$$T_f = \frac{bT_a - T_s}{(b-1)}$$ (EQUATION 8)

The pump manufacturer can initially determine b by experiment where $T_f$ is directly measured while $T_s$ and $T_a$ are determined from the tubing temperature sensor 471 and ambient temperature control sensor 472, respectively. To this end, equation 8 is solved for b to yield:

$$b = \frac{T_f - T_s}{T_f - T_a}$$ (EQUATION 9)

Then, in order to experimentally determine b, the fluid temperature $T_f$ can be maintained at a selected value as directly measured by a suitable, third temperature sensor (not shown in the Figures) which is in contact with the fluid f. With $T_f$ held constant, $T_s$ and $T_a$ can be determined from the tubing temperature sensor 471 and ambient temperature control sensor 472, respectively. The value of the constant b can then be calculated. Preferably, a number of experimentally determined values of b are calculated by the pump manufacturer at various, different, fluid temperatures $T_f$ within a temperature range that is normally expected to be encountered for refrigerated liquids and room temperature (or warmer) liquids. A presently contemplated range for $T_f$ is about 15°–35° C. The mean value of the constant b as determined over the range of $T_f$ can be calculated.

The calculated mean value of the constant b may then be employed in equation 8 above to calculate the fluid temperature $T_f$ during normal operation of the pump (when direct measurement of the fluid temperature is not feasible). The calculated value of $T_f$ is a sufficiently good approximation of the actual fluid temperature so that the calculated value of $T_f$ can be used as the basis for more accurately controlling the pump flow rate. To this end, the temperature sensors 471 and 472 are provided as part of a pump control system which continuously monitors the sensor output signals during normal operation of the pump. A suitable microprocessor system is provided for calculating the fluid temperature $T_f$ (pursuant to equation 8 discussed above). The calculated fluid temperature $T_f$ is then used as the basis for adjusting the pump operating speed. In particular, the flow rate for a particular pump operating speed at a standard room temperature is constant for a particular pump design. The change in flow rate as a function of the change in the fluid temperature from the standard room temperature can be readily determined by experiment by the pump manufacturer. Such experimental data can be used by the pump manufacturer to provide the pump control system with an appropriate pump motor speed variation system which will speed up or slow down the pump motor speed so as to maintain the flow rate that has been set by the nurse or other medical professional.

It will be readily apparent from the foregoing detailed description of the invention and from the illustrations thereof that numerous variations and modifications may be effected without departing from the true spirit and scope of the novel concepts or principles of this invention.

What is claimed is:

1. A peristaltic pump adapted to receive a tube, the pump comprising:
    a first temperature sensor constructed to be positioned adjacent a portion of a tube disposed within said peristaltic pump, said first temperature sensor constructed to detect a temperature of a tube disposed within said peristaltic pump; and
    a second temperature sensor constructed to detect an ambient temperature inside said peristaltic pump, said second temperature sensor positioned at a location thermally isolated from a tube disposed within said peristaltic pump.

2. The pump of claim 1 further including a system for adjusting an operating speed of said peristaltic pump as a function of said temperature of a tube disposed within said peristaltic pump and said ambient temperature.

3. The pump of claim 1 further including an electrical insulator disposed adjacent said first temperature sensor, whereby when a tube is disposed within said peristaltic pump, said electrical insulator is positioned between said first temperature sensor and a tube disposed within said peristaltic pump.

4. A peristaltic pumping system comprising a tube constructed to be peristaltically deformed to cause a fluid within said tube to flow therethrough, a first temperature sensor positioned adjacent said tube for sensing a temperature of said tube, an electrical insulator positioned between said first temperature sensor and said tube, a peristaltic pump head constructed to peristaltically deform said tube, and a second temperature sensor constructed to detect an ambient temperature within said pumping system, said second temperature sensor being thermally isolated from said tube.

5. The pump of claim 4 further including a system for controlling speed of operation of said peristaltic pump head as a function of said temperature of a fluid flowing through said tube and said ambient temperature.

* * * * *